March 10, 1925.
M. J. MOHAN
1,529,603
SHIPPING CAN
Filed Feb. 7, 1924
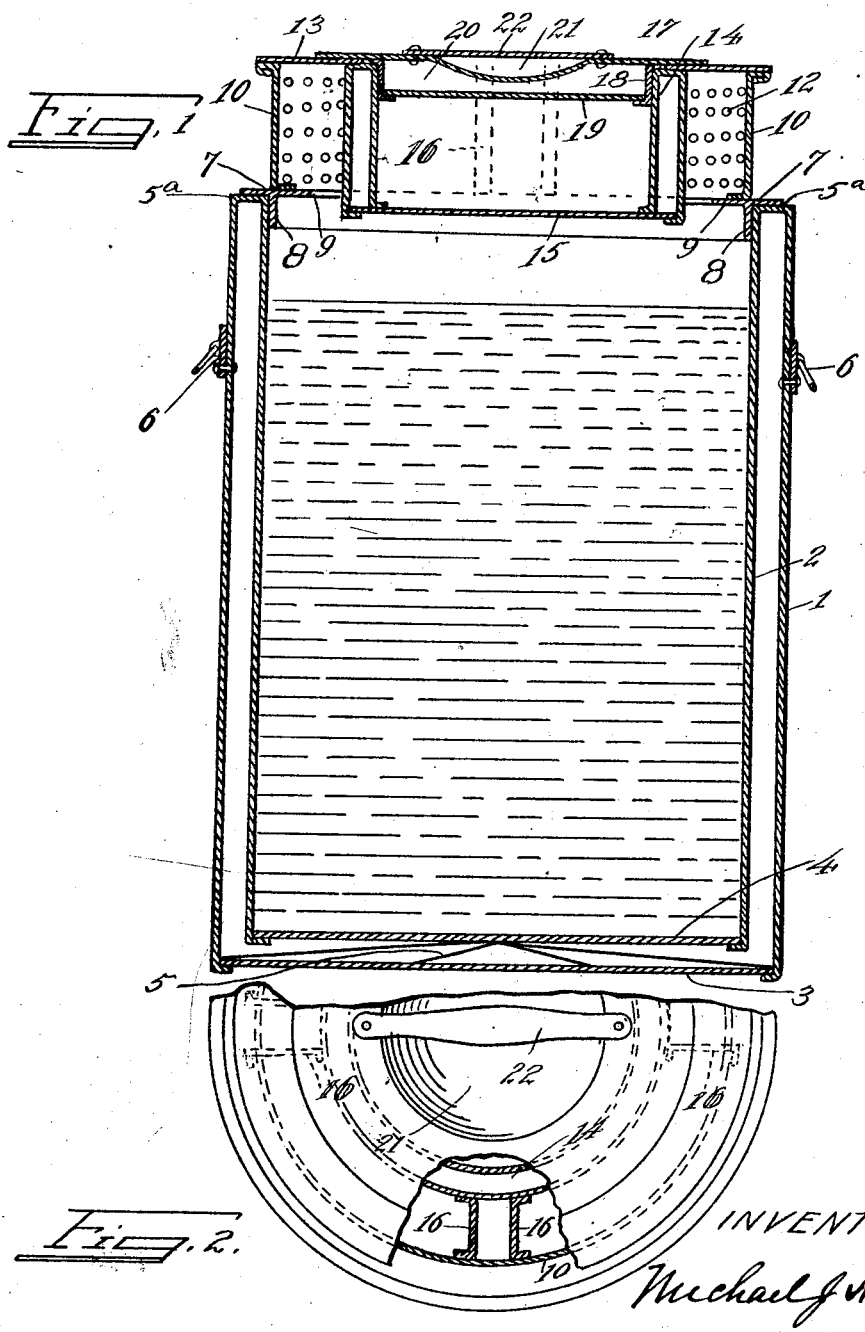
INVENTOR:
Michael J. Mohan
BY Allen & Allen
ATTORNEYS.

Patented Mar. 10, 1925.

1,529,603

UNITED STATES PATENT OFFICE.

MICHAEL J. MOHAN, OF COVINGTON, KENTUCKY.

SHIPPING CAN.

Application filed February 7, 1924. Serial No. 691,119.

*To all whom it may concern:*

Be it known that I, MICHAEL J. MOHAN, a citizen of the United States, and a resident of Covington, in the county of Kenton and State of Kentucky, have invented certain new and useful Improvements in Shipping Cans, of which the following is a full, clear, and exact description, reference being had to the accompanying drawing, forming part of this specification.

The object of my invention is to provide a convenient and effective can or container for the transportation of live fish, particularly gold and ornamental fish, and also minnows and other small fish.

Heretofore with receptacles provided for this purpose, it has been found very difficult to keep the fish alive, so much so that express companies almost place an embargo on such transportation, except for short distances, and great care has to be taken to place careful limits on the number of fish placed in the receptacle.

It is the object of my invention, therefore, to provide a receptacle in which proper air circulation can be obtained and an even temperature maintained both in hot and cold weather.

The invention consists of that certain novel construction and arrangements of parts to be hereinafter more particularly pointed out and claimed, whereby these results are attained.

In the drawing:

Figure 1 is a central vertical section of the can.

Figure 2 is a partial top plan view with the top broken away.

The body of the container comprises a double walled preferably cylindrical vessel of outer side walls 1 and inner side walls 2 with bottom 3 for the outer vessel and bottom 4 for the inner vessel with a brace or support 5 intermediate the double bottom.

The construction practically embodies two open vessels, one inside the other with an intermediate air insulation space and with the vessels soldered together at the top with a flat upper portion 5ª between the walls.

Before soldering together the air space may be filled with suitable insulating material, but I prefer to employ simple air insulation for the bottom and sides of the vessel. For convenient handling drop handles 6 are riveted or otherwise secured to the sides.

The cover for the can comprises an annular flanged base 7 to rest on top of the top with a flange 8 to fit closely inside the can and an inwardly projecting flange 9 to prevent the liquid from splashing out of the can in transportation.

Soldered or otherwise permanently secured on this base 7 is a cylindrical wall 10 which is provided with numerous perforations 12 for entrance of air and on this cylindrical portion is soldered or otherwise secured a disk plate 13 with a central circular opening, to which is secured around the opening a depending double walled inner vessel 14, similar in construction to the main vessel except that the bottom 15 is single and not double. This smaller vessel is further braced and held in position by wings or braces 16 secured between its side wall and the perforated cylinder 10.

For this inner vessel I provide a cover disk 17 which has soldered to it an annular flange 18 to fit snugly within the upper end with the flange provided with a bottom plate 19 which forms an air insulation space 20 with the cover 17, and the central portion of the cover is depressed at 21, so that a handle 22 can be riveted across the depression presenting a substantially flat upper surface, so that cans or other merchandise can be stacked on top of the container without damage.

This inner vessel 14 is designed to hold a supply of ice in hot weather or heated bricks or other material in freezing weather, the single bottom 15 permitting the cold or heat to descend to the water through the single bottom while insulation is provided for the sides and top of the receptacle.

By perforating the sides of the single cylinder 10 a very much larger air circulation is obtained than would be possible through a perforated cover plate on top, and moreover, in shipment there is no liability of the side perforations being covered up and thus the very essential air circulation destroyed.

It will be understood, as shown in the drawing, that the can is not filled entirely full of water, and under these circumstances in the rocking and jarring of the can in transportation, air is to a certain extent sucked in from one side more than the other, and this causes a circulation of air by reason of the fact that the perforations are around the sides of the can top. The thing that is especially desirable in the transportation of fish, is that the air is kept fresh. I have known in many instances of fish being killed by too much aeration with a pump. If the can was filled with water up to the bottom 15 of the cover part, there would be no chance of circulation of air over the top of the water, and under these circumstances the fish would die in a short time. The object of providing an inner vessel to hold a supply of ice in hot weather and heated bricks in freezing weather and the insulation of the sides of this vessel with only a single bottom, provides a cool or hot space as the case may be, between the bottom 15 and the surface of the water and this is amply sufficient to maintain the desired temperature for the water, which must be neither too hot nor too cold.

Having thus described my invention, what I claim as new and desire to secure by Letters Patent, is:—

1. In a container of the character specified, a main vessel for liquid having double walls open at its upper end, with a closure for the open end comprising a flanged base to fit within and rest upon the upper end of the sides of the main vessel, said base provided with an upwardly extending cylindrical portion perforated for the free circulation of air and a top plate with a central opening therein, and a cover for the central opening.

2. In a container of the character specified, a main vessel for liquid having double walls open at its upper end, with a closure for the open end comprising a flanged base to fit within and rest upon the upper end of the sides of the main vessel, said base having an inwardly projecting flange and provided with an upwardly extending cylindrical portion perforated for the free circulation of air and a top plate with a central opening therein, and a cover for the central opening.

3. In a container of the character specified, a main vessel for liquid having double walls open at its upper end, with a closure for the open end comprising a flanged base to fit within and rest upon the upper end of the sides of the main vessel, said base provided with an upwardly extending cylindrical portion perforated for the free circulation of air and a top plate with a central opening therein, an inner vessel secured to and depending from said plate around the central opening with a cover for said inner vessel.

4. In a container of the character specified, a main vessel for liquid having double walls open at its upper end, with a closure for the open end comprising a flanged base to fit within and rest upon the upper end of the sides of the main vessel, said base provided with an upwardly extending cylindrical portion perforated for the free circulation of air and a top plate with a central opening therein, an inner vessel secured to and depending from said plate around the central opening, said vessel having double walls with an intermediate air space and a cover for said inner vessel.

5. In a container of the character specified, a main vessel for liquid having double walls open at its upper end, with a closure for the open end comprising a flanged base to fit within and rest upon the upper end of the sides of the main vessel, said base provided with an upwardly extending cylindrical portion perforated for the free circulation of air and a top plate with a central opening therein, an inner vessel secured to and depending from said plate around the central opening, said vessel having double walls with an intermediate air space and a flat cover for said inner vessel, said flat cover having a depending flange to fit within the inner vessel, and a bottom plate to form with the cover plate a double top with intermediate air space.

6. In a container of the character specified, a main vessel for liquid having double walls open at its upper end, with a closure " the open end comprising a flanged base to fit within and rest upon the upper end of the sides of the main vessel, said base provided with an upwardly extending cylindrical portion perforated for the free circulation of air and a top plate with a central opening therein, an inner vessel secured to and depending from said plate around the central opening, said vessel having double walls with an intermediate air space and a flat cover for said inner vessel, said flat cover having a depending flange to fit within the inner vessel, and a bottom plate to form with the cover plate a double top with intermediate air space, the cover plate having a central depression with a flat handle secured across the depression to permit ready handling of the top cover without obstructing the top surface of the cover.

MICHAEL J. MOHAN.